(12) United States Patent
Ueda et al.

(10) Patent No.: US 9,072,029 B2
(45) Date of Patent: *Jun. 30, 2015

(54) MOBILE COMMUNICATION SYSTEM, CONTROL DEVICE, BASE STATION DEVICE, SYSTEM CONTROL METHOD AND DEVICE CONTROL METHOD

(71) Applicants: Yoshio Ueda, Minato-ku (JP); Sadafuku Hayashi, Minato-ku (JP)

(72) Inventors: Yoshio Ueda, Minato-ku (JP); Sadafuku Hayashi, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,580

(22) Filed: Jan. 24, 2014

(65) Prior Publication Data

US 2014/0140299 A1  May 22, 2014

Related U.S. Application Data

(62) Division of application No. 13/054,896, filed as application No. PCT/JP2009/058991 on May 14, 2009.

(30) Foreign Application Priority Data

Aug. 1, 2008 (JP) ................................ 2008-200277

(51) Int. Cl.
*H04W 48/06* (2009.01)
*H04W 28/10* (2009.01)
(Continued)

(52) U.S. Cl.
CPC .............. *H04W 48/06* (2013.01); *H04L 47/14* (2013.01); *H04W 28/10* (2013.01); *H04W 92/12* (2013.01);
(Continued)

(58) Field of Classification Search
CPC ......... H04W 28/02; H04W 28/0252–28/0263; H04W 28/10; H04W 28/12; H04W 72/04; H04W 72/0406; H04W 72/042; H04W 72/0433; H04W 76/02; H04W 76/04; H04W 76/06; H04W 80/02; H04W 92/10; H04W 92/12; H04L 47/14
USPC .............. 370/310–310.2, 328–330, 336–338, 370/343, 345; 455/450–453, 464, 418, 419
See application file for complete search history.

(56) References Cited

U.S. PATENT DOCUMENTS

2008/0043652 A1  2/2008  Otonari et al.
2010/0061324 A1  3/2010  Liao et al.

FOREIGN PATENT DOCUMENTS

JP  3-505960 A  12/1991
JP  2001-103093 A  4/2001
(Continued)

OTHER PUBLICATIONS

Common Test Environmens for User Equipment (UE); Conformance Testing (Release 8), 3 GPP TS 34. 108 V8. 3.0, Jun. 2008.
(Continued)

*Primary Examiner* — Un C Cho
*Assistant Examiner* — Jeremy Costin
(74) *Attorney, Agent, or Firm* — Sughrue Mion, PLLC

(57) ABSTRACT

A mobile communication system includes a control device and a base station device. Data communication between the control device and the base station device is conducted using a fixed-length data size and a variable-length data size. The control device transmits information indicating whether a data size of the data communication has a fixed length or a variable length. The base station device receives the information from the control device.

24 Claims, 13 Drawing Sheets

(51) Int. Cl.
| | | |
|---|---|---|
| *H04W 92/12* | (2009.01) | |
| *H04L 12/801* | (2013.01) | |
| *H04W 48/02* | (2009.01) | |
| *H04W 72/04* | (2009.01) | |
| *H04W 28/02* | (2009.01) | |
| *H04W 28/06* | (2009.01) | |
| *H04W 72/10* | (2009.01) | |
| *H04W 76/02* | (2009.01) | |
| *H04W 88/02* | (2009.01) | |
| *H04W 88/08* | (2009.01) | |
| *H04W 88/12* | (2009.01) | |

(52) U.S. Cl.
CPC .......... *H04W 48/02* (2013.01); *H04W 72/0433* (2013.01); *H04W 28/0252* (2013.01); *H04W 28/06* (2013.01); *H04W 72/0413* (2013.01); *H04W 72/10* (2013.01); *H04W 76/027* (2013.01); *H04W 88/02* (2013.01); *H04W 88/08* (2013.01); *H04W 88/12* (2013.01)

(56) References Cited

FOREIGN PATENT DOCUMENTS

| | | | |
|---|---|---|---|
| JP | 2001-512939 | A | 8/2001 |
| JP | 2003-283596 | A | 10/2003 |
| JP | 2003-284135 | A | 10/2003 |
| JP | 2004-254301 | A | 9/2004 |
| JP | 2006-191554 | A | 7/2006 |
| JP | 2008-48325 | A | 2/2008 |
| JP | 2008-512033 | A | 4/2008 |
| WO | 2004/112318 | A1 | 12/2004 |
| WO | 2006/103136 | A1 | 10/2006 |
| WO | 2006/104347 | A1 | 10/2006 |
| WO | 2007/091838 | A1 | 8/2007 |
| WO | 2007/129597 | A1 | 11/2007 |
| WO | 2010/013526 | A1 | 2/2010 |

OTHER PUBLICATIONS

UTRAN Iub Interface Node B Application Part (NBAP) Signalling (Release 8), 3GPP TS 25. 433 V8. 1. 0, Jun. 2008, pp. 161-165.
UTRAN Iur Interface User Plane Protocols for Common Transport Channel Data Streams (Release 7), 3GPP TS 25. 425 V7. 7. 0., Mar. 2008.
High Speed Downlink Packet Access (HSDPA); Overall Description Stage 2 (Release 8), 3GPP TS 25.308 V8.2.0, May 2008.
Office Action Issued May 15, 2012, by the Intellectual Property Office of Japan in counterpart Japan Application No. 2010-522648.
Ericsson, "Support of higher bitrates and Flexible RLC PDU size on HS-DSCH in RAN Transport Network", 3GPP TSG-RAN WG3 Meeting #55, R3-070150, St. Louis, Missouri, Feb. 12-16, 2007, pp. 1-9.
Ericsson, "Re-establishment condition for RLC reconfiguration to fixed from flexible PDU size", 3GPP TSG WG2 Meeting #62, Kansas City, Missouri, May 5-9, 2008, R2-082118, pp. 1-5.
"Universal Mobile Telecommunications System (UMTS); High Speed Packet Access (HSPA) evolution; Frequency Division Duplex (FDD) (3GPP TR 25.999 version 7.1.0 Release 7); ETSI TR 125 999", IEE, LIS, Sophia Antipolis Cedex, France, vol. 3-R2, No. V7.1.0, Apr. 1, 2008, pp. 1-60.
NEC: "Information for Fixed and Flexible RLC PDU size", 3GPP TSG-RAN WG3 Meeting #63, Athens, Greece, Feb. 9-13, 2009, R3-090630, pp. 1-46.
NEC: "Alignment of improved L2 with RRC", 3GPP TSG-RAN WG3 Meeting #61, Jeju, Korea, Aug. 18-22, 2008, Mobile Competence Centre, pp. 1-123.
European Search Report dated Sep. 26, 2012 issued by the European Patent Office in counterpart European Application No. 09802771.7.
Japanese Patent Application mailed Dec. 4, 2012 for corresponding Patent Application No. 2010-522648.
3rd Generation Partnership Project; Technical Specification Group Radio Access Network; UTRAN Iur interface RNSAP signalling (Release 7); 3GPP TS 25.423 V7.9.0 (Jun. 2008) pp. 60-62.
TSG-RAN WG2 Meeting #48bis, Cannes, France, Oct. 10-14, 2005, User plane protocol enhancements.
Russian Office Action mailed May 15, 2012 for corresponding Russian Patent Application No. 2011107746.
Office Action dated Feb. 12, 2013 issued by the Japanese Patent Office in counterpart Japanese Patent Application No. 2012-162449.
Nokia Siemens Networks, et al., "Correction on HS-DSCH MAC-d PDU Size Format in HS-DSCH Information to Modify", 3GPP Draft; R3-080145, 3rd Generation Partnership Project (3GPP), Mobile Competence Centre ; 650, Route Des Lucioles ; F-06921 Sophia-Antipolis Cedex ; France, vol. RAN WG3, no. Sorrento, Italy; Feb. 5, 2008, XP050163370, Total 5 pages.
Ericsson, "Support of higher bitrates and Flexible RLC PDU size on HS-DSCH in RAN Transport Network", Discussion and Approval, 3GPP TSG-RAN WG3 Meeting #55, St. Louis, Missouri, Feb. 12-16, 2007, pp. 1-14, R3-070416.
Office Action dated Jul. 30, 2013 issued by the Japanese Patent Office in counterpart Japanese Application No. 2013-129557.
Office Action dated Oct. 17, 2013 issued by the Korean Intellectual Property Office in corresponding Korean Patent Application No. 10-2013-7017049.
Ericsson, "Support of higher bitrates and Flexible RLC PDU size on HS-DSCH", 3GPP TSG-RAN WG3 Meeting #55, R3-070154, 3GPP, Feb. 16, 2007, total 86 pages.
Communication from the European Patent Office issued May 7, 2013 in counterpart European Application No. 13154110.4.
Communication from the Japanese Patent Office dated May 14, 2013, in a counterpart application No. 2013-034434.
Communication from the Canadian Patent Office issued May 17, 2013 in counterpart Canadian Application No. 2,732,689.
Ericsson, "Introducing Flexible RLC PDU Size in the Uplink", 3GPP TSG-RAN2 Meeting #61, Sorrento, Italy, Feb. 11-15, 2008, R2-081315, pp. 1-15.
3GPP TSG-RAN WG2#55-R2-062847, Seoul, Korea, Oct. 13, 2006, pp. 1-3.
3GPP TSG RAN2 #58b-R2-072495, Orlando, FL, Jun. 29, 2007, all pages.
Communication dated Aug. 22, 2014, from the Russian Patent Office in counterpart Russian Application No. 2013108898.
Nokia Siemens Networks, Nokia, "Introduction of the Improved L2 in the Uplink", 3GPP TSG-RAN WG3 Meeting #59, Sorrent, Italy, Feb. 11-15, 2008, 6 pages total.
Communication dated Jan. 20, 2015, issued by the Japanese Patent Office in counterpart Japanese application No. 2014-218163.
Communication dated Dec. 24, 2014, issued by the Russian Patent Office in counterpart Russian application No. 2013108898.

Fig.1    PRIOR ART

|  |  | CASE 1<br>Fixed RLC +<br>MAC-hs<br>(Rel-5 and later releases)<br>NOTE 2 | CASE 2<br>Fixed RLC +<br>MAC-ehs<br>(Rel_7 and later releases)<br>NOTE 2 | CASE 3<br>Flexible RLC +<br>MAC-ehs<br>(Rel-7 and later releases)<br>NOTE 2 |
|---|---|---|---|---|
| Higher layer | RAB/Signaling RB | RAB | | |
| RLC | Logical channel type | DTCH | | |
|  | RLC mode | AM | | |
|  | Payload sizes, bit | 320 (alt 640) | 320 (alt 640) | Flexible up to 12000 |
|  | Max data rate, bps | depends on UE category<br>NOTE 1 | | |
|  | AMD PDU header, bit | 16 | 16 | 16 |
| MAC | MAC-d header, bit | 0 | 0 | 0 |
|  | MAC multiplexing | N/A | N/A | N/A |
|  | MAC-d PDU size, bit | 336 (alt 656) | 336 (alt 656) | Flexible |
|  | MAC-hs Type | MAC-hs | MAC-ehs | MAC-ehs |
|  | MAC-hs/MAC-ehs header fixed part, bit | 21 | 24 | 24 |
| Layer 1 | TrCH type | HS-DSCH | HS-DSCH | HS-DSCH |
|  | TTI | 2 ms | 2 ms | 2 ms |
|  | Coding type | TC | TC | TC |
|  | CRC, bit | 24 | 24 | 24 |
|  | Applicable modulation schemes | QPSK, 16QAM | QPSK, 16QAM, 64QAM | QPSK, 16QAM, 64QAM |
|  | Applicable with MIMO | No | Yes | Yes |
| NOTE 1: The peak throughput may be limited by the maximum number of MAC-d PDUs that can be included in a single MAC-hs or MAC-ehs PDU (see 3GPP TS 25.321 [38]). | | | | |
| NOTE 2: Alternative 1 with Fixed RLC + MAC-hs is the default configuration. For test cases that use alternatives 2 (Fixed RLC + MAC-ehs) or 3 (Flexible RLC + MAC-ehs) then this shall be explicitly stated in the test case. | | | | |

Fig.2   PRIOR ART

| IE/Group Name | Presence | Range | IE Type and Reference | Semantics Description | Criticality | Assigned Criticality |
|---|---|---|---|---|---|---|
| HS-DSCH MAC-d Flow Specific Information | | 1..<maxnoofMACdFlows> | | | – | |
| >HS-DSCH MAC-d Flow ID | M | | 9.2.1.31i | | – | |
| >Allocation/Retention Priority | M | | 9.2.1.1A | | – | |
| >Binding ID | O | | 9.2.1.4 | Shall be ignored if bearer establishment with ALCAP. | – | |
| >Transport Layer Address | O | | 9.2.1.63 | Shall be ignored if bearer establishment with ALCAP. | – | |
| >TNL QoS | O | | 9.2.1.58A | Shall be ignored if bearer establishment with ALCAP. | YES | Ignore |
| Priority Queue Information | | 1..<maxnoofPrioQueues> | | | – | |
| >Priority Queue ID | M | | 9.2.1.49C | | – | |
| >Associated HS-DSCH MAC-d Flow | M | | HS-DSCH MAC-d Flow ID 9.2.1.31i | The HS-DSCH MAC-d Flow ID shall be one of the flow IDs defined in the HS-DSCH MAC-d Flow Specific Information of this IE. Multiple Priority Queues can be associated with the same HS-DSCH MAC-d Flow ID. | – | |
| >Scheduling Priority Indicator | M | | 9.2.1.53H | | – | |
| >T1 | M | | 9.2.1.56a | | – | |
| >Discard Timer | O | | 9.2.1.24E | | – | |
| >MAC-hs Window Size | M | | 9.2.1.38B | | – | |
| >MAC-hs Guaranteed Bit Rate | O | | 9.2.1.38Aa | | – | |
| >MAC-d PDU Size Index | | 1..<maxnoofMACdPDUIndexes> | | | – | |
| >>SID | M | | 9.2.1.53I | Shall be ignored if Maximum MAC-d PDU Size Extended IE is present. | – | |
| >>MAC-d PDU Size | M | | 9.2.1.38A | Shall be ignored if Maximum MAC-d PDU Size Extended IE is present. | – | |
| >RLC Mode | M | | 9.2.1.52B | | – | |
| >Maximum MAC-d PDU Size Extended | O | | MAC PDU Size Extended 9.2.1.38C | | YES | Reject |

Fig.3    PRIOR ART

|  | RLC PROTOCOL CONTROLLER #1 |
|---|---|
| RLC PDU SIZE | FIXED SIZE 656 BITS = 82 BYTES |
| NBAP Maximum MAC-d PDU Size Extended | 82 BYTES |
| MAC-hs TYPE | MAC-ehs USED |
| 64QAM | USED |
| MIMO | USED |

Fig.9

| IE/Group Name | Presence | Range | IE Type and Reference | Semantics Description | Criticality | Assigned Criticality |
|---|---|---|---|---|---|---|
| HS-DSCH MAC-d Flow Specific Information | | 1..<maxnoofMACdFlows> | | | – | |
| >HS-DSCH MAC-d Flow ID | M | | 9.2.1.31I | | – | |
| >Allocation/Retention Priority | M | | 9.2.1.1A | | – | |
| >Binding ID | O | | 9.2.1.4 | Shall be ignored if bearer establishment with ALCAP. | – | |
| >Transport Layer Address | O | | 9.2.1.63 | Shall be ignored if bearer establishment with ALCAP. | – | |
| >TNL QoS | O | | 9.2.1.58A | Shall be ignored if bearer establishment with ALCAP. | YES | ignore |
| Priority Queue Information | | 1..<maxnoofPrioQueues> | | | – | |
| >Priority Queue ID | M | | 9.2.1.49C | | – | |
| >Associated HS-DSCH MAC-d Flow | M | | HS-DSCH MAC-d Flow ID 9.2.1.31I | The HS-DSCH MAC-d Flow ID shall be one of the flow IDs defined in the HS-DSCH MAC-d Flow Specific Information of this IE. Multiple Priority Queues can be associated with the same HS-DSCH MAC-d Flow ID. | – | |
| >Scheduling Priority Indicator | M | | 9.2.1.53H | | – | |
| >T1 | M | | 9.2.1.56a | | – | |
| >Discard Timer | O | | 9.2.1.24E | | – | |
| >MAC-hs Window Size | M | | 9.2.1.39B | | – | |
| >MAC-hs Guaranteed Bit Rate | O | | 9.2.1.38Aa | | – | |
| >MAC-d PDU Size Index | | 1..<maxnoofMACdPDUIndexes> | | | – | |
| >>SID | M | | 9.2.1.53I | Shall be ignored if Maximum MAC-d PDU Size Extended IE is present. | – | |
| >>MAC-d PDU Size | M | | 9.2.1.38A | Shall be ignored if Maximum MAC-d PDU Size Extended IE is present. | – | |
| >RLC Mode | M | | 9.2.1.52B | | | |
| >RLC PDU SIZE INDICATOR | | | | | | |
| >Maximum MAC-d PDU Size Extended | O | | MAC PDU Size Extended 9.2.1.38C | | YES | reject |

Fig.10

9.2.1.xx    DL RLC PDU Size Format

The DL *RLC PDU Size Format* IE indicates the downlink RLC PDU size format used for a Priority Queue.

| IE/Group Name | Presence | Range | IE Type and Reference | Semantics Description |
|---|---|---|---|---|
| DL RLC PDU Size Format | | | ENUMERATED ( Fixed RLC PDU size, Flexible RLC PDU size ....) | |

Fig.13

| IE/Group Name | Presence | Range | IE Type and Reference | Semantics Description |
|---|---|---|---|---|
| HS-DSCH MAC-d PDU Size Format | | | ENUMERATED (Indexed MAC-d PDU Size, Flexible MAC-d PDU Size, Fixed MAC-d PDU size for MAC-ehs) | |

MOBILE COMMUNICATION SYSTEM, CONTROL DEVICE, BASE STATION DEVICE, SYSTEM CONTROL METHOD AND DEVICE CONTROL METHOD

This is a divisional application based upon U.S. patent application Ser. No. 13/054,896 filed Jan. 19, 2011, which is a National Stage of International Application No. PCT/JP2009/058991 filed May 14, 2009, claiming priority based on Japanese Patent Application No. 2008-200277 filed Aug. 1, 2008, the contents of all of which are incorporated herein by reference in their entirety.

TECHNICAL FIELD

The present invention relates to a mobile communication system for conducting data communication using a fixed-length or variable-length data size.

BACKGROUND ART

In 3GPP ($3^{rd}$ Generation Partnership Project), the HSDPA (High Speed Downlink Packet Access) standard for W-CDMA mobile communication has been standardized (see non-patent document 1). In HSDPA, the MAC-hs protocol or MAC-ehs protocol is used for the MAC (Medium Access Control) layer. HSDPA provides packet-based high-speed data communication on a downlink from an RNC (radio network controller) to a UE (user equipment) via a Node-B. In HSDPA data communication, flow control is performed between the RNC (radio network controller) and the Node-B (base station).

In the flow control, the Node-B notifies the RNC of the data capacity, and the RNC transmits data within the data capacity to the Node-B. Here, the Node-B determines the data capacity, taking into consideration, e.g., the capacity of the radio channel, the product quality report provided by the UE, the priority allocated to the bearer, and the state of the transmission path between the RNC and the Node-B as parameters. Notification of the data capacity is provided via a frame protocol control message called CAPACITY ALLOCATION.

In the HSDPA data communication, there are three types of cases contemplated for communication modes. Parameters conforming to each case are set for RNCs and Node-Bs.

FIG. 1 is a chart illustrating an example of parameter settings for the respective cases of HSDPA. Referring to FIG. 1, examples of parameter settings for respective cases 1 to 3 are illustrated. Case 1 has already been defined in 3GPP Release 5 onwards, and cases 2 and 3 are expected to be defined in 3GPP Release 7 onwards.

In case 1, the size of PDUs (protocol data units) in the RLC (radio link control) layer (hereinafter referred to as "RLC PDU size" has a fixed length, and for the MAC layer, the MAC-hs protocol is used. A PDU is a unit of a transmit signal in a predetermined protocol. For example, a PDU includes a header according to a predetermined protocol and a payload including data in the protocol.

In the MAC-hs protocol, neither 64QAM (Quadrature Amplitude Modulation) nor MIMO (Multiple Input Multiple Output) are used.

In case 2, the RLC PDU size has a fixed length as in case 1, but the MAC-ehs protocol is used for the MAC layer. In the MAC-ehs protocol, 64QAM and MIMO can be used. Also in the MAC-ehs, a transmission method called Improved Layer 2 in Downlink is used.

64QAM, which is one of digital modulation methods, expresses 64 values through a combination of eight phase types and eight amplitude types. MIMO is a radio communication technique for expanding a data communication band using a plurality of antennas simultaneously. In Improved Layer 2, the MAC-ehs protocol provided in Node-B segments user data. Improved Layer 2 enables more efficient data transfer compared to a transmission method in which user data is divided by a fixed length in an RLC.

In case 3, the RLC PDU size has a variable length, and for the MAC layer, the MAC-ehs protocol is used. In this case, a Node-B designates a maximum length of the RLC PDU size. An RNC can select an RLC PDU size within a range equal to or less than the maximum length designated by the Node-B. In flow control, the Node-B can control the maximum value of the RLC PDU size.

In flow control in 3GPP Release 7 into which the MAC-ehs protocol has been introduced, a format called CAPACITY ALLOCATION TYPE 2 is used instead of a format called CAPACITY ALLOCATION TYPE 1 that is used in 3GPP Release 5.

With a frame in CAPACITY ALLOCATION TYPE 2, a Node B can control the following four elements.
(1) Maximum MAC-d/c PDU Length (MAC-d PDU length)
(2) HS-DSCH Credit (the number of MAC-d PDUs that can be transmitted during an interval of transmission in an HS-DSCH)
(3) HS-DSCH Interval (duration in which the number of MAC-d PDUs indicated by the HS-DSCH credit are transmitted)
(4) HS-DSCH Repetition Period (repetition count indicating the number of repetitions of the above duration)

For example, where a radio channel is going into a congestion, the MAC-d/c PDU Length (Maximum MAC-d/c PDU length) may be reduced or the HS-DSCH credit may be reduced in order to suppress the downlink data amount. An HS-DSCH (High-Speed Downlink Shared Channel) is a channel shared by a plurality of HSDPA data communications.

As described above, in cases 2 and 3, which are to be defined in 3GPP Release 7 onwards, 64QAM and MIMO, which could not used in and before 3GPP Release 6, can be used.

Between cases 2 and 3 to be defined in 3GPP Release 7 onwards, there is a difference in whether the RLC PDU size has a fixed length or a variable length.

In case 3, since the RLC PDU size is variable, the maximum value of the RLC PDU size can be changed in a range equal to or less than 1504 octets in flow control. As a result of such flow control, more efficient data communication can be provided according to the changing communication status.

Meanwhile, case 2 enables use of 64QAM and MIMO while performing flow control using an existing and simple algorithm with the RLC PDU size fixed as in case 1.

CITATION LIST

Non Patent Literature

Non Patent Literature 1: 3GPP TS 25.308 V8.2.0 (May 2008), High Speed Downlink Packet Access (HSDPA), Overall description, Stage 2 (Release 8)

SUMMARY OF INVENTION

Technical Problem

In order to use 64QAM or MIMO, it is necessary to use the MAC-ehs protocol. Where the MAC-ehs protocol is used, the RLC PDU size may have a fixed length or a variable length, and thus, for an RLC to operate, it is necessary to set the RLC PDU size to have a fixed length or a variable length.

However, in the NBAP protocol (Node B Application Part, 3GPP TS25.433), which is a current call control protocol, an RNC cannot notify a Node B of whether the RLC PDU size has a fixed length or a variable length. FIG. 2 is a chart illustrating parameters in the NBAP protocol. This chart is one illustrated in 3GPP TS 24.4339.2.1.311A. Referring to FIG. 2, it can be seen that there is no information element for notifying a setting of whether the RLC PDU size has a fixed length or a variable length, and thus, notification of such setting cannot be provided by the NBAP protocol. Consequently, there is a problem that a discrepancy in the setting states of whether the RLC PDU size has a fixed length or a variable length may occur between an RNC and a Node-B.

When the MAC-ehs protocol is used, the current NBAP supposes that the HS-DSCH MAC-d PDU Size Format IE has a "Flexible MAC-d PDU Size". Consequently, an RNC sets the RLC PDU size to have a fixed length, and a Node-B sets the RLC PDU size to have a variable length, which may result in a discrepancy in the state between the RNC and the Node-B.

If the RLC PDU size is set to have a variable length, the Node-B may give an instruction to change the RLC PDU size to the RNC in flow control. However, the RNC cannot change the RLC PDU size because the RLC PDU size is set to have a fixed length.

For example, where the Node-B gives an instruction to provide a size larger than the fixed length set in the RNC, to the RNC, the Node-B should be able to receive a PDU with a size larger than the fixed length. However, where the RLC PDU size is set to have a fixed length in the RNC, the RNC segments the data by the fixed length. In that case, use efficiency of system resources such as a band cannot be sufficiently enhanced.

Also, for example, if the Node-B gives an instruction to provide a size smaller than the fixed length set in the RNC, to the RNC, the RNC in which the RNC PDU size is set to have the fixed length cannot transmit data to the Node-B or sends data with a size exceeding the limit, to the Node-B. In such case, serious failures occur in the flow control and/or system operation.

FIG. 3 is a chart illustrating a communication mode example for describing a failure in flow control. FIG. 4 illustrates an example of a sequence resulting in occurrence of a defect in flow control.

In the FIG. 3 example, the RLC PDU size is 82 bytes, the MAC-ehs protocol is used, and MIMO and 64QAM are used.

In this case, NBAP Maximum MAC-d PDU Size Extended IE, which designates a maximum value of the MAC-d PDU size, is set to 82 bytes.

Referring to the FIG. 4 sequence, first, an RNC sets the RLC PDU size to have a fixed length (step 901). When MAC-ehs is used, no logical channel multiplexing is performed in the MAC-d layer, and thus, no MAC-d header is provided. Accordingly, in this example, the MAC-d PDU size is equal to the RLC PDU size (step 902).

The RNC prepares an NBAP: RL SETUP REQUEST message (step 903) and transmits the message to a Node B (step 904). This NBAP: RL SETUP REQUEST message includes a Maximum MAC-d PDU Size Extended IE set to 82 bytes, which is the maximum value of the MAC-d PDU size.

By receiving the NBAP: RL SETUP REQUEST message, the Node B recognizes that the maximum value of the MAC-d PDU size is 82 bytes (step 904), and sets the maximum value together with information on 64QAM, MIMO and MAC-ehs (step 905).

After establishment of HSDPA, flow control is started.

Here, it is assumed that the Node-B decides to set the MAC-d PDU size to a size smaller than 82 bytes in flow control because of a radio channel congestion (step 908). The Node-B sets the maximum value of the MAC-d PDU size to a new value smaller than 82 bytes (step 909) and sends an HS-DSCH CAPACITY ALLOCATION TYPE 2 control frame including a Maximum MAC-d PDU Size Extended IE in which the value has been set, to the RNC (step 910). This frame is a frame used for the Node-B to notify the RNC of control information on the flow control. Examples of the control information in the flow control include MAC-d/c PDU Length, credits and a transmission interval.

Since the RLC PDU size is set to a fixed length, the RNC cannot transmit data with a length shorter than the fixed length, resulting in data communication being stopped (step 911).

An object of the present invention is to provide a technique preventing a discrepancy in a state of setting, between devices, regarding whether the data size in data communication has a fixed length or a variable length in a mobile communication system.

Solution to Problem

In order to achieve the above object, a mobile communication system according to an aspect of the present invention includes a control device and a base station device, wherein data communication between the control device and the base station device is conducted using a fixed-length data size and a variable-length data size;

wherein the control device transmits information indicating whether a data size of the data communication has a fixed length or a variable length; and wherein the base station device receives the information from the control device.

A control device according to the present invention includes:

communication means for communicating with a base station device using a fixed-length data size and a variable-length data size; and transmission means for transmitting information indicating whether a data size of the data communication has a fixed length or a variable length to the base station device.

A base station device according to an aspect of the present invention includes:

communication means for communicating with a control device, using a fixed-length data size and a variable-length data size; and reception means for receiving information indicating whether a data size of the data communication has a fixed length or a variable length from the control device.

A system control method according to an aspect of the present invention provides a communication control method for a mobile communication system including a control device and a base station device, wherein data communication between the control device and the base station device is conducted using a fixed-length data size and a variable-length data size;

wherein the control device transmits information indicating whether a data size of the data communication has a fixed length or a variable length; and wherein the base station device receives the information from the control device.

A device control method according to an aspect of the present invention includes:

communicating with a base station device, using a fixed-length data size and a variable-length data size; and transmitting information indicating whether a data size of the data communication has a fixed length or a variable length, to the base station device.

BRIEF DESCRIPTION OF DRAWINGS

FIG. 1 is a chart illustrating examples of parameters set in respective cases of HSDPA.

FIG. 2 is a chart illustrating parameters in the NBAP protocol.

FIG. 3 is a chart illustrating a communication mode example for describing a flow control failure.

FIG. 9 is a diagram for describing an overview of an NBAP protocol message.

FIG. 10 is a diagram illustrating an example of change of 3GPP TS 25.433.

FIG. 13 is a diagram illustrating an example of definition of an HS-DSCH MAC-d PDU Size Format according to a fourth exemplary embodiment.

DESCRIPTION OF EMBODIMENTS

Exemplary embodiments will be described in detail with reference to the drawings. A radio communication system described as an exemplary embodiment is a W-CDMA mobile communication system according to 3GPP.

First Exemplary Embodiment

Figure 4:
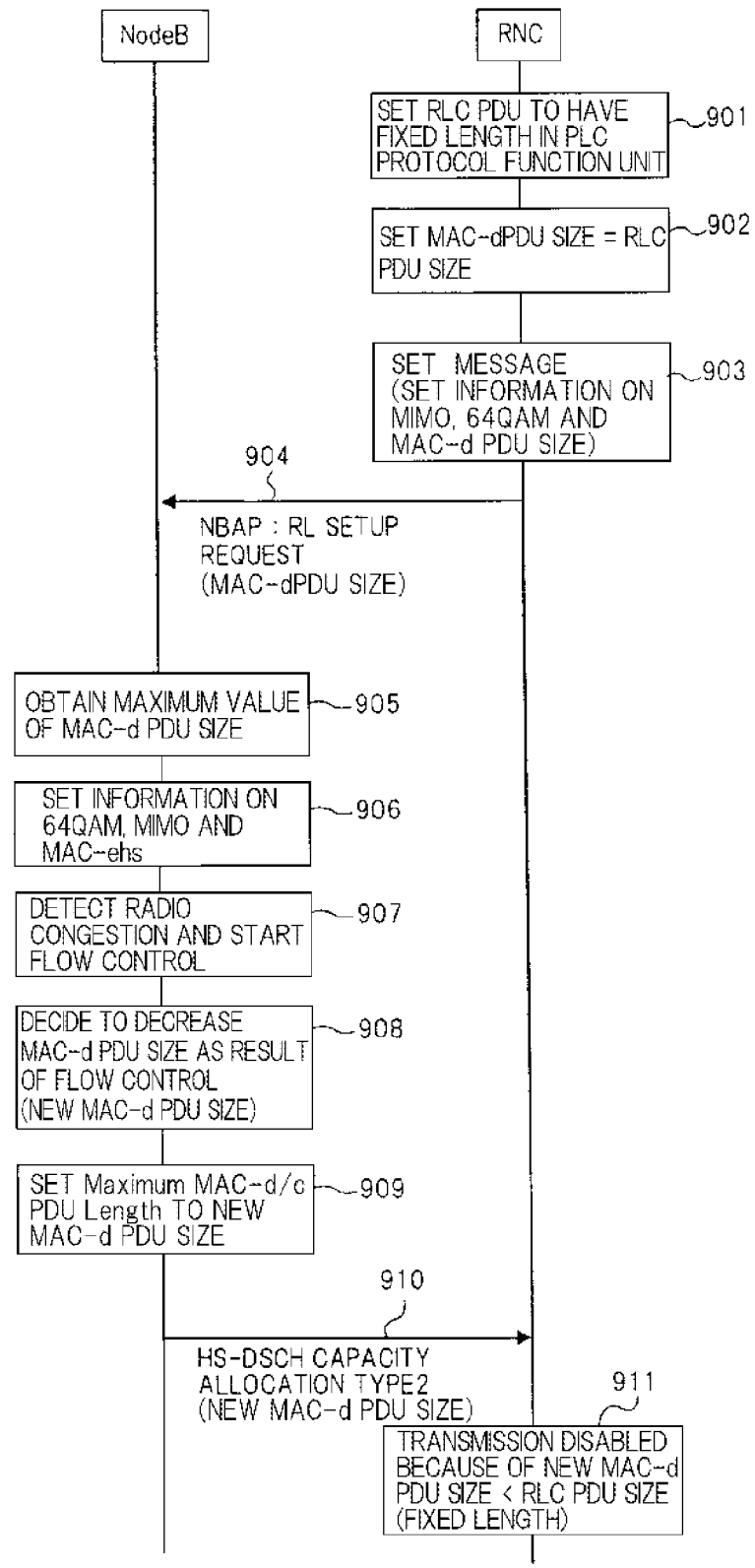
FIG. 4 is a diagram illustrating an example of a sequence resulting in the occurrence of a flow control failure.
Figure 5:
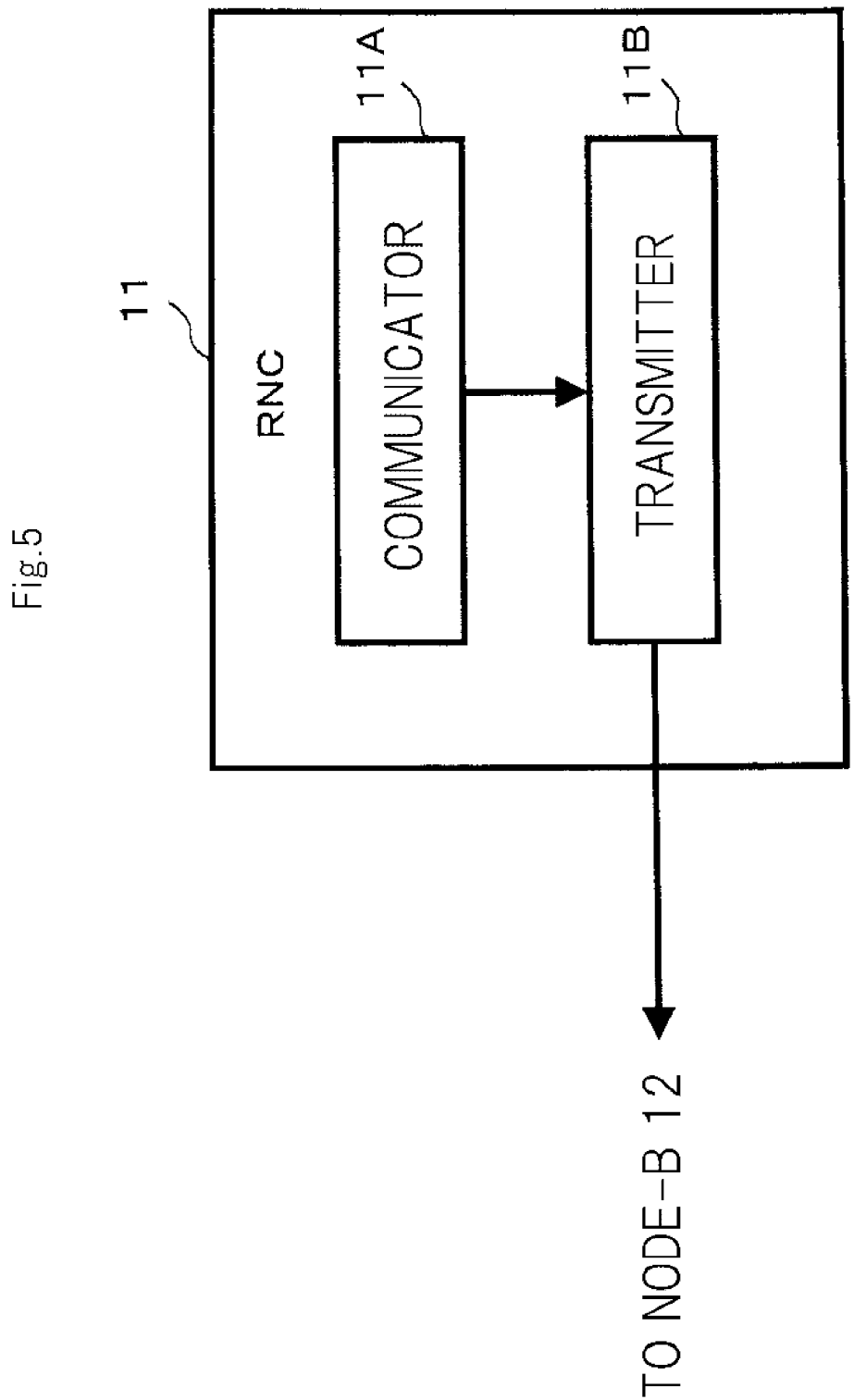
FIG. 5 is a block diagram illustrating a configuration of RNC 11 according to a first exemplary embodiment.

FIG. 5 illustrates the configuration of RNC 11 according to a first exemplary embodiment.

As illustrated in FIG. 5, RNC 11 includes communicator 11A that communicates with a base station device using a fixed-length data size and a variable-length data size, and transmitter 11B that provides notification of (transmits) information indicating whether the data size of the data communication has a fixed length or a variable length to the base station device (Node-B 12).

Accordingly, in the present exemplary embodiment, notification of information indicating whether the data size of data communication is fixed or variable (identification information) can be provided from RNC 11 to Node-B 12.

Figure 6:
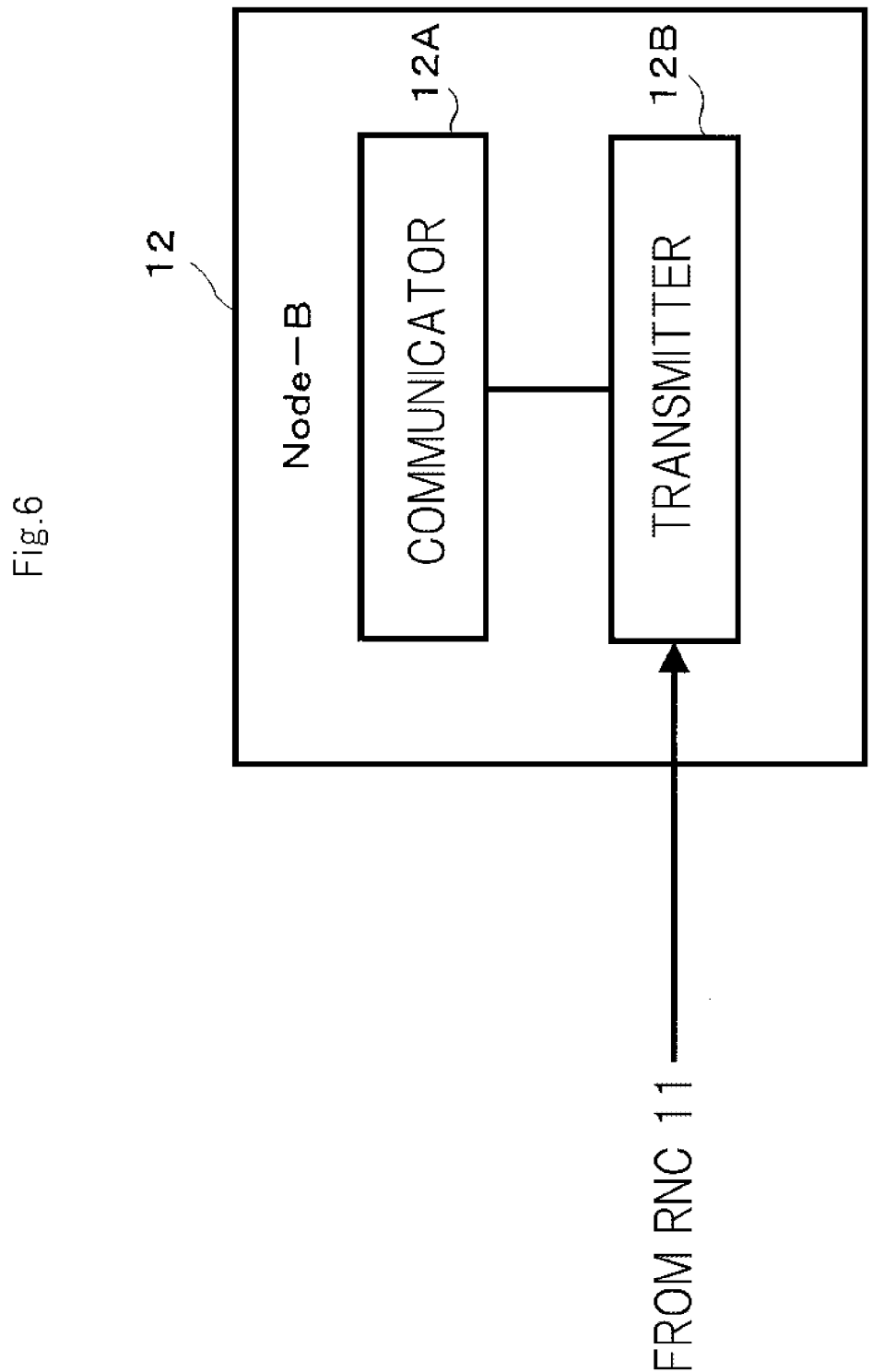
FIG. 6 is a block diagram illustrating a configuration of Node-B 12 according to the first exemplary embodiment.

FIG. 6 illustrates the configuration of Node-B 12 according to the first exemplary embodiment.

As illustrated in FIG. 6, Node-B 12 includes receiver 12B that receives information indicating whether the data size of data communication has a fixed length or a variable length from a control device (RNC 11), and communicator 12A that communicates with the control device using a fixed-length data size and a variable-length data size.

Accordingly, in the present exemplary embodiment, Node-B 12 receives the information (the identification information) transmitted from RNC 11, enabling prevention the occurrence of a discrepancy in setting state between the devices, regarding whether the transmit data size in data communication has a fixed length or a variable length.

Second Exemplary Embodiment

Figure 7:
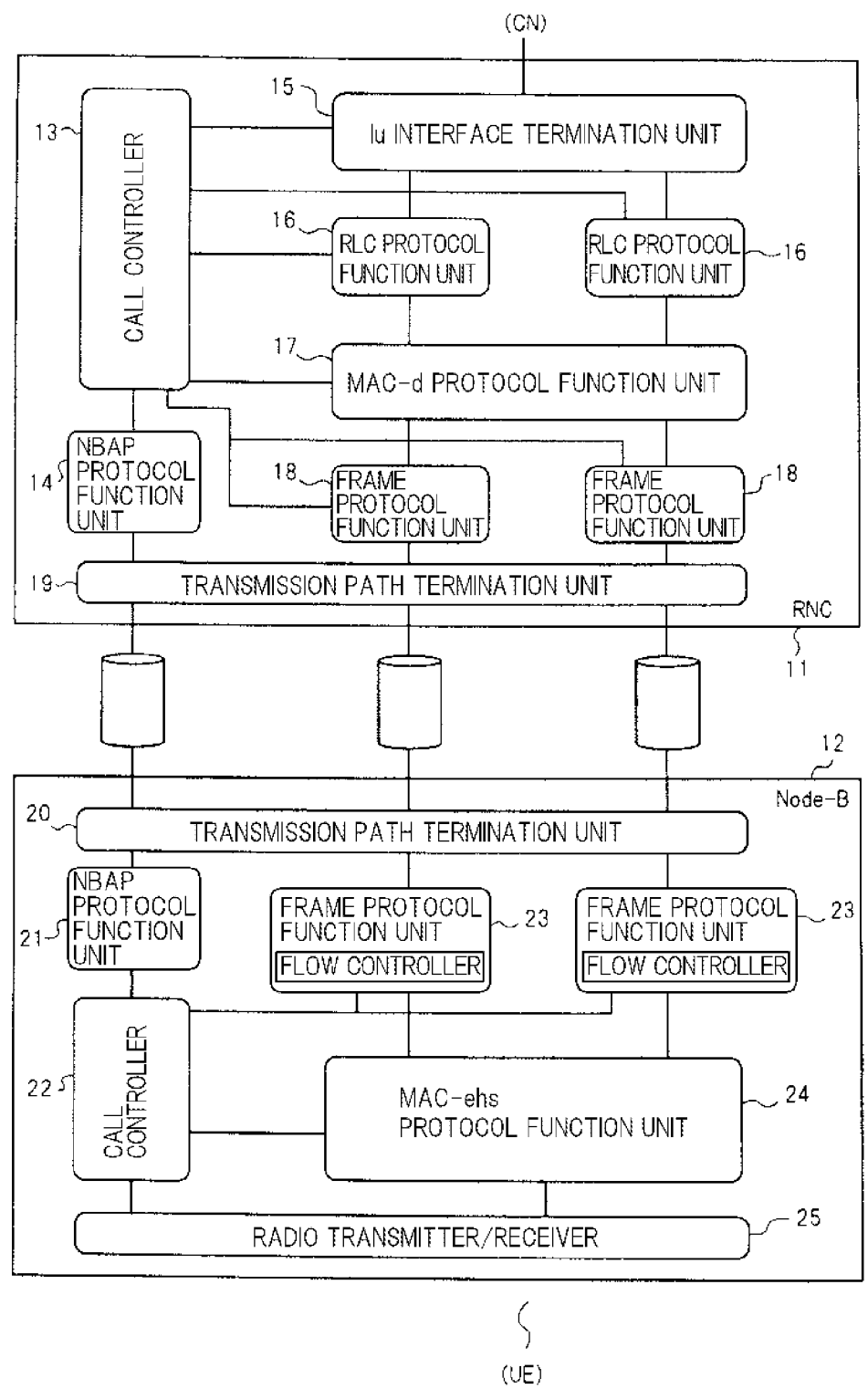
FIG. 7 is a block diagram illustrating a configuration of a mobile communication system according to a second exemplary embodiment.

FIG. 7 is a block diagram illustrating the configuration of a mobile communication system according to a second exemplary embodiment. The present exemplary embodiment is an embodiment of the configuration of RNC 11 according to the first exemplary embodiment illustrated in FIG. 5 and the configuration of Node-B 11 according to the first exemplary embodiment illustrated in FIG. 6. Referring to FIG. 7, the mobile communication system according to the present exemplary embodiment includes RNC 11 and Node-B 12. RNC 11, which is connected to a CN (core network) and Node-B 11 (not illustrated), controls Node-B 12, providing communication of user data by a UE (not illustrated). Node-B 12, which is connected to the UE (not illustrated) via a radio channel, relays the user data between the UE and RNC 11.

The mobile communication system enables data communication by means of HSDPA, and responds to both of the cases where the transmit data size of downlink data using HSDPA has a fixed length and a variable length.

RNC 11 provides notification of (transmits) identification information indicating whether the transmit data size of downlink data is set to have a fixed length or a variable length to Node-B 12. Notification of this identification information is provided by means of a message according to a call control protocol terminated by RNC 11 and Node-B 12. The message used for the notification of the identification information is a message sent from RNC 11 to Node-B 12 when a radio link is set, changed or added.

Node-B 12 operates based on the identification information provided by RNC 11. For example, Node-B 12 performs flow control of data communication based on the identification information. In the flow control, Node-B 12 adaptively changes a plurality of elements according to the communication status, and notifies RNC 11 of these elements.

RNC 11 transmits downlink data to Node-B 12 within the scope of the limitations imposed by the elements provided, and according to a downlink data size format provided to Node-B 12 via the identification information (i.e., whether the transmit data size of the downlink data has a fixed length or a variable length). Consequently, the data amount of the downlink data and the like can properly be controlled according to the communication status, enabling properly coping with, e.g., congestions.

Examples of elements for flow control include an allowed transmit data size, an allowed data frame transmission interval, and the number of data frame transmissions allowed within a predetermined period of time.

If the identification information provided by RNC 11 indicates that the transmit data size has a fixed length, Node-B 12 performs flow control with fixing the transmit data size from among these elements.

In the present exemplary embodiment, the identification information may be, for example, one-bit information. More specifically, the bit "1" indicates that the RLC PDU size is a variable length, and the bit "0" indicates that the RLC PDU size is a fixed length.

According to the present exemplary embodiment, notification of identification information indicating whether the transmit data size is set to a fixed length or a variable length is provided from RNC 11 to Node-B 12, and Node-B 12 operates based on the identification information provided by RNC 11, enabling prevention the occurrence of a discrepancy in the setting state between the devices, as regards whether the transmit data size has a fixed length or a variable length.

Furthermore, if notification of whether the transmit data size has a fixed length or a variable length is provided from RNC 11 to Node-B 12 when a radio link is set, Node-B 12 performs flow control with the transmit data size fixed, based on the recognition shared with RNC 11, immediately after the setting of the radio link. Similarly, if notification of whether the transmit data size has a fixed length or a variable length is provided when a radio link is changed or added, Node-B 12 can perform flow control with the transmit data size fixed, immediately after the change or addition of the radio link.

Referring to FIG. 7 again, RNC 11 includes transmission path termination unit 19, call controller 13 and call control protocol processor 14, which are included in a control plane, Iu interface termination unit 15, RLC protocol function units 16, MAC-d protocol function unit 17 and frame protocol function units 18, which are included in a user plane.

Call controller 13 performs various kinds of processing relating to call control. The call control includes call establishment when there is an outgoing call from the UE or an incoming call to the UE, and release of the established call. The call control also includes establishment and release of an HSDPA communication by the UE. In the call control, call controller 13 transmits/receives call control messages to/from Node-B 12, the UE or the CN.

Call control protocol processor 14 compiles and analyzes messages according to the NBAP protocol, which is a call control protocol shared with Node-B 12, under the control of call controller 13.

For example, when an HSDPA communication is established, call controller 13 transmits/receives an NBAP protocol message to/from Node-B 12 via call control protocol processor 14, to perform the settings for MIMO, 64QAM or MAC-ehs.

Iu interface termination unit 15 terminates an Iu interface with the CN. More specifically, Iu interface termination unit 15 provides, e.g., functions of the PDCP (Packet Data Convergence Protocol) set forth in 3GPP TS 25.323, the Iu user plane protocol set forth in 3GPP TS 25.415, and the GTP-U protocol indicated in 3GPP TS 29.060.

For a downlink example, Iu interface termination unit 15 retrieves RLC PDUs from a downlink signal received from the high-order CN via the Iu interface and transmits the RLC PDUs to RLC protocol function units 16. For an uplink example, Iu interface termination unit 15 transmits uplink data from RLC protocol function units 16 to the CN via the Iu interface.

RLC protocol function units 16 provide a function of the RLC set forth in 3GPP TS 25.322. The RLC function is a function that performs various kinds of processing relating to radio link control. RLC protocol function units 16 perform processing on data transmitted/received by the UE, according to the RLC protocol by means of the RLC function. Three types of modes are defined for an RLC transmission method. The first is acknowledged mode (hereinafter abbreviated as RLC-AM). The second is unacknowledged mode (RLC-UM). The third is transparent mode (RLC-TM).

In RLC-AM mode, until 3GPP Release 6, the RLC PDU (protocol data unit) size had a fixed length, and user data was segmented in the RLC layer.

However, in 3GPP Release 7, a function called Improved Layer 2 has been introduced to HSDPA. For Node-B 12, the MAC-ehs protocol is used instead of the MAC-hs protocol. Rather than data being segmented according to the RLC protocol in RNC 11, high-order data is segmented according to the MAC-ehs protocol in Node-B 12, enabling provision of flexible RLC-AM data with a variable length in addition to RLC-AM with a fixed length. In the case of a variable length, data with a maximum RLC PDU size of 1503 octets is transmitted from RNC 11 to Node-B 12.

MAC-d protocol function unit 17 implements the MAC-d protocol, which is one of the MAC functions set forth in 3GPP TS 25.321. The MAC-d protocol is a part of the protocol for the MAC layer, and the entire protocol for the MAC layer includes this MAC-d protocol, and the MAC-hs protocol or the MAC-ehs protocol. The MAC-d protocol enables multiplexing of a plurality of logical channels from the plurality of RLC protocol function units 16. However, no logical channel multiplexing is performed when Node-B 12 uses the MAC-ehs.

Frame protocol function units 18 implement an HS-DSCH frame protocol function set forth in 3GPP TS 25.435. The HS-DSCH frame protocol is a protocol for performing generation and segmentation of an HS-DSCH frame used in HSDPA. Frame protocol function units 18 in RNC 11 generate downlink data frames.

In high-speed data transmission using 64QAM or MIMO, HS-DSCH DATA FRAME TYPE 2 is used for the frame type. Accordingly, frame protocol function units 18 generate data frames of HS-DSCH DATA FRAME TYPE 2.

Also, frame protocol function units 18 perform processing for flow control between frame protocol function units 18 and frame protocol function units 23 in Node-B 12.

For example, upon detection of radio channel interference, transmission power insufficiency and/or an Iub interface transmission path congestion, frame protocol function units 23 in Node-B 12 transmit an HS-DSCH CAPACITY ALLOCATION TYPE 2 to frame protocol function units 18 in RNC 11, thereby giving an instruction to suppress downlink data frame transmissions to RNC 11.

Conversely, when the congestion, etc., has been relieved, frame protocol function units 23 in Node-B 12 transmit an HS-DSCH CAPACITY ALLOCATION TYPE 2 to frame protocol function units 18 in RNC 11, thereby giving permission to increase downlink data frame transmissions to RNC 11.

The instructions for suppressing and increasing downlink data frame are given by prescribing the MAC-d/c PDU Length, credits or a transmission interval.

Frame protocol function units 18 in RNC 11 transmit data of an HS-DSCH DATA FRAME TYPE 2 according to the MAC-d/c PDU Length, credits or a transmission interval provided by the HS-DSCH CAPACITY ALLOCATION TYPE 2 received from frame protocol function units 23 in Node-B 12.

Transmission path termination unit 19 transmits/receives data in a format conforming to a transport bearer on a transmission path between RNC 11 and Node-B 12 (Iub interface) to/from transmission path termination unit 20 in Node-B 12. For the transport bearer, for example, ATM (Asynchronous Transfer Mode) or IP (Internet Protocol) is used.

For example, where there are two packet services, there are logical channels for the respective packet services. In MAC-d protocol function unit 17, those logical channels are not multiplexed, and thus, there are also transport bearers for the respective packet services.

Referring to FIG. 7 again, Node-B 12 includes transmission path termination unit 20, radio transmitter/receiver 25, NBAP protocol function unit 21 and call controller 22, which are included in a control plane, and frame protocol function units 23 and MAC-ehs protocol function unit 24, which are included in a user plane.

Transmission path termination unit 20 faces transmission path termination unit 19 in RNC 11 via transmission paths (Iub interface) between Node-B 12 and RNC 11, and transmits/receives data in a format conforming to a transport bearer to/from transmission path termination unit 19 in RNC 11.

NBAP protocol function unit 21 compiles and analyzes NBAP protocol messages transmitted/received to/from RNC 11 under the control of call controller 22.

Call controller 22 performs various kinds of processing relating to call control. In call control, call controller 22 transmits/receives call control messages to/from RNC 11 or the UE.

Frame protocol function units 23, which face frame protocol function units 18 in RNC 11, implement an HS-DSCH frame protocol function. More specifically, frame protocol function units 23 receive a data frame of HS-DSCH DATA FRAME TYPE 2 according to the HS-DSCH Frame Protocol from frame protocol function units 18 in RNC 11, retrieve MAC-d PDUs in the frame, and transmit the MAC-d PDUs to MAC-ehs protocol function unit 24.

Also, as described above, frame protocol function units 23 perform processing for flow control, between frame protocol function units 23 and frame protocol function units 18 in RNC 11.

MAC-ehs protocol function unit 24 segments data from RNC 11 and transmits the segmented data to the UE via radio transmitter/receiver 25. As a result of MAC-ehs protocol function unit 24 in Node-B 12 performing the data segmentation, inefficient padding at the RLC level in RNC 11 can be avoided.

Radio transmitter/receiver 25, which are connected to the UE via a radio channel, transmits/receives call control messages from call controller 22 and user data from MAC-ehs protocol function unit 24.

Figure 8:
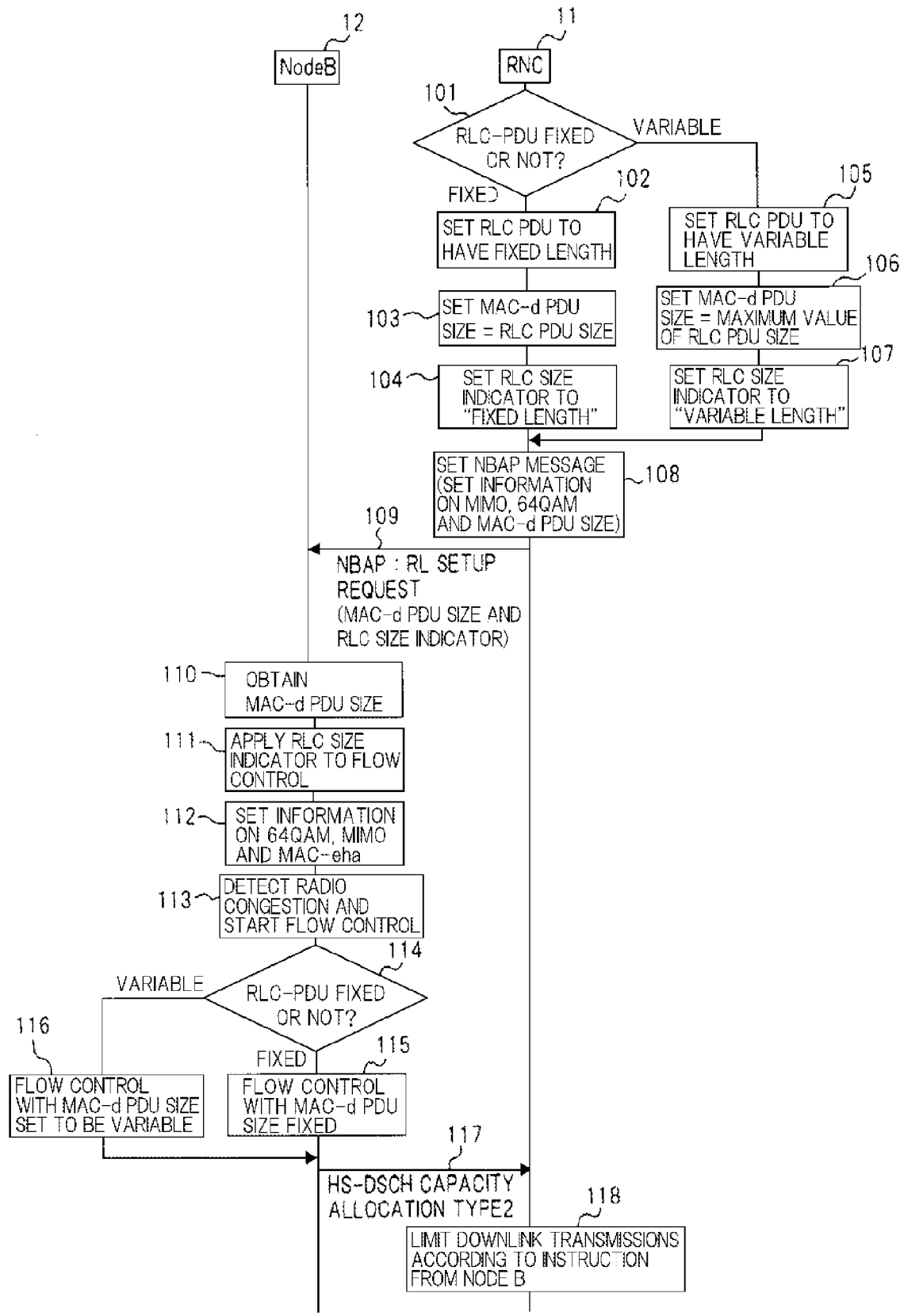
FIG. 8 is a sequence diagram illustrating an operation of a mobile communication system according to the second exemplary embodiment.

FIG. 8 is a sequence diagram illustrating an operation of the mobile communication system according to the second exemplary embodiment. In the mobile communication system according to the present exemplary embodiment, when a radio link is set, changed or added, notification of whether the RLC PDU size has a fixed length or a variable length is provided from RNC 11 to Node-B 12. FIG. 8 illustrates a sequence when a radio link is set. Also, here, an operation of the system from when notification of whether the RLC PDU size has a fixed length or a variable length is provided from RNC 11 to Node-B 12 to when Node-B 12 performs flow control according to the notification.

Referring to FIG. 8, where the RLC mode is RLC-AM mode, call controller 13 in RNC 11, first, determines whether the RLC PDU size is fixed or variable (step 101).

If the RLC PDU size is fixed, call controller 13 sets an RLC size indicator indicating that the RLC PDU size has a "fixed length" in RLC protocol function units 16 (step 102). Next, call controller 13 sets the RLC PDU size as the MAC-d PDU size (step 103). Furthermore, call controller 13 sets the RLC size indicator to "fixed length" (step 104).

Meanwhile, it has been determined in step 101 that the RLC PDU size is variable, call controller 13 sets an RLC size indicator indicating that the RLC PDU size has a "variable length" in RLC protocol function units 16 (step 105). Next, call controller 13 sets a maximum value of the RLC PDU size as the MAC-d PDU size (step 106). Furthermore, call controller 13 sets the RLC size indicator to "variable length" (step 107).

Then, after step 104 or 107, call control protocol processor 14 compiles an NBAP RL SETUP REQUEST message in which, for example, use of MIMO and 64QAM, the MAC-d PDU size and the RLC size indicator are set (step 108), and sends the message to Node-B 12 (step 109). This RLC size indicator enables notification of whether the RLC PDU size has a fixed length or a variable length to be provided from RNC 11 to Node-B 12.

FIG. 9 is a diagram for describing an overview of an NBAP protocol message. FIG. 9 indicates that an RLC size indicator, which is a new parameter, is added to the chart of information elements in 3GPP TS 25.433 9.2.1.311A. Whether the RLC size has a fixed length or a variable length is set in this indicator.

Upon receipt of the NBAP protocol message, call controller 22 in Node-B 12 obtains the MAC-d PDU size from the message (step 110). Call controller 22 further obtains the RLC size indicator, and applies the value of the indicator to flow control in frame protocol function units 23 (step 111). Also, call controller 22 sets information regarding, for example, whether or not the MAC-ehs protocol is used, in MAC-ehs protocol function unit 24 (step 112).

Frame protocol function units 23, which perform flow control, start flow control upon detection of, for example, a radio channel congestion (step 113). In the flow control, frame protocol function units 23 first check the RLC size indicator (step 114).

If the RLC PDU size has a fixed length, frame protocol function units 23 control the other parameters with the MAC-d PDU Length IE kept fixed (step 115). Frame protocol function units 23 limit, for example, the credits, the transmission interval or the repetition period without changing the MAC-d PDU Length IE, thereby coping with the radio channel congestion.

Meanwhile, if it has been determined in step 114 that the RLC PDU size has a variable length, frame protocol function units 23 control the various kinds of parameters including the MAC-d PDU Length IE (step 116).

A flow control instruction from frame protocol function units 23 is provided to RNC 11 via an HS-DSCH CAPACITY ALLOCATION TYPE 2 message (step 117). Frame protocol function units 18 in RNC 11 control downlink data transmissions according to the instruction from frame protocol function units 23 in Node-B 12 (step 118).

Since a sequence for the case where a radio link is set is illustrated here, the RLC size indicator has been set in the NBAP RL SETUP REQUEST message. For another example, if a radio link is added, the RCL PDU size indicator may be set in an NBAP RL ADDITION REQUEST message. Also, if a radio link is changed, the RCL PDU size indicator may be set in an NBAP RL RECONFIGURATION PREPARE message or an RL RECONFIGURATION REQUEST message.

According to the present exemplary embodiment, even if the RLC PDU size has a fixed length, the recognition in RNC 11 and the recognition in Node-B 12 become consistent with each other, enabling HSDPA communications using the MAC-ehs protocol to be conducted favorably. In that case, the RLC PDU size is not set to have a variable length in the flow control, enabling application of existing processing to RLC protocol function units 16.

Furthermore, in the mobile communication system according to the present exemplary embodiment, the MAC-ehs protocol can be used even if the RLC PDU size has a fixed length, enabling maintenance of compatibility with a system prior to 3GPP Release 7. For example, when a serving cell change is made as result of the UE moving from an area covered by a Node-B prior to 3GPP Release 7 to an area covered by Node-B 12 according to 3GPP Release 7 onwards, the RLC PDU size can be kept to have a fixed length. There is no need to reset the RLC processing, enabling reduction of data loss in high-order users (for example, UEs).

The RLC PDU size identification information (RLC PDU size indicator) is used by Node-B 12 for a priority queue. For example, Node-B 12 performs flow control for each priority queue, using the identification information. The details of this example will be described below.

Node-B 12, upon receipt of downlink user data from RNC 11, evaluates common channel priority indicators (CmCH-PIs) in MAC-d PDU data, and allocates the MAC-d PDU data to priority queues associated with the respective MAC-d PDU data. Here, these CmCH-PIs are associated not only with priority queues in Node-B 12, but also with RLC PDU size identification information. Therefore, the RLC PDU size identification information has an effect on selection of a MAC-d PDU length (Maximum MAC-d/c PDU Length) in flow control performed for each priority queue.

As described above, whether the MAC-d PDU length has a variable length or a fixed length can be selected for each priority queue, and thus, Node-B 12 can perform flow control for each priority queue, in other words, according to the associated priority (CmCH-PI).

A CmCH-PI corresponds to a Scheduling Priority Indicator provided via NBAP in FIG. 9. A CmCH-PI is set and updated by RNC 11. A priority queue is a storage area (buffer) that temporarily stores downlink user data from RNC 11. In each priority queue, QoS requirements are considered. Examples of the QoS requirements include a traffic class and a peak rate.

An example of change of 3GPP TS 25.433 regarding RLC PDU size identification information, that is, an RLC PDU size format in the above description is illustrated in FIG. 10.

The above description in the present exemplary embodiment has been given in terms of the case where identification information is normally provided from RNC 11 to Node-B 12 via a call control protocol message as a normal operation. However, for an actual system, it is preferable to consider an abnormal operation. An example of an operation where there is an abnormality in notification from RNC 11 to Node-B 12 as an abnormal operation will be indicated below.

When identification information included in a message for requesting setting, change or addition of a communication link, which has been sent from RNC 11 to Node-B 12 indicates that the transmit data size has a variable length, if the message includes either an information element indicating that the MAC-d PDU size has a fixed length, or an information element indicating a maximum MAC-d PDU size, Node-B 12 cannot interpret the message normally. Therefore, Node-B 12 sends a message for rejecting the setting, change or addition of a communication link, to RNC 11. Consequently, the request from RNC 11 is rejected and the procedure is cancelled.

Possible specific examples will be described below. Upon receipt of messages 1 to 3, Node-B 12 detects an "abnormal condition", that is, abnormal setting, and rejects the request from RNC 11 to cancel the procedure.

1. RL SETUP REQUEST message
(1) If a RADIO LINK SETUP REQUEST message received from an RNC includes an information element, DL RLC PDU Size Format, for a predetermined priority queue, in which the RLC PDU size has been set so as to have a variable length and an information element, HS-DSCH MAC-d PDU Size Format that has a value indicating that the MAC-d PDU size has a fixed length, a Node-B transmits a RADIO LINK SETUP FAILURE message for rejecting the request procedure from the RNC, to the RNC.
(2) If a RADIO LINK SETUP REQUEST message received from an RNC does not include an information element, Maximum MAC-d PDU Size Extended, for a predetermined priority queue, and an information element, DL RLC PDU Size Format that has a value indicating that the RLC PDU size has a variable length, a Node-B transmits a RADIO LINK SETUP FAILURE message for rejecting the request procedure from the RNC.
(3) If a RADIO LINK SETUP REQUEST message received from an RNC includes an information element, HS-DSCH MAC-d PDU Size Format, in which the MAC-d PDU size has been set so as to have a variable length, and does not include an information element, DL RLC PDU Size Format, a Node-B transmits a RADIO LINK SETUP FAILURE message for rejecting the request procedure from the RNC.

2. RL ADDITION REQUEST message
(1) If a RADIO LINK ADDITION REQUEST message received from an RNC includes an information element of DL RLC PDU Size Format for a predetermined priority queue, in which the RLC PDU size has been set so as to have a variable length, and an information element of HS-DSCH MAC-d PDU Size Format has a value indicating that the MAC-d PDU size has a fixed length, a Node-B transmits a RADIO LINK ADDITION FAILURE message for rejecting the request procedure from the RNC, to the RNC.
(2) If a RADIO LINK ADDITION REQUEST message received from an RNC does not include an information element of Maximum MAC-d PDU Size Extended for a predetermined priority queue, and an information element of DL RLC PDU Size Format has an value indicating that the RLC PDU size has a variable length, a Node-B transmits a RADIO LINK ADDITION FAILURE message for rejecting the request procedure from the RNC.
(3) If a RADIO LINK ADDITION REQUEST message received from an RNC includes an information element of HS-DSCH MAC-d PDU Size Format in which the MAC-d PDU size has been set so as to have a variable length, but does not include an information element of DL RLC PDU Size Format, a base station transmits a RADIO LINK ADDITION FAILURE message for rejecting the request procedure from the RNC.

3. RL RECONFIGURATION REQUEST message
[1] In re-setting of a synchronous radio link:
(1) If there is a priority queue that is set so that the RLC PDU size has a variable length and is not set so as to use Maximum MAC-d PDU Size Extended, in a new configuration, a Node-B transmits a RADIO LINK RECONFIGURATION FAILURE message for rejecting the request procedure from an RNC, to the RNC.
(2) If there is a priority queue in which the relevant Node B Communication Context has been set so that the MAC-d PDU size has a fixed length and the RLC PDU size has a variable length, in a new configuration, a Node-B transmits a RADIO LINK RECONFIGURATION FAILURE message for rejecting the request procedure from an RNC, to the RNC.
(3) If the relevant Node B Communication Context has been set so that the MAC-d PDU size has a variable length, and does not include an information element, DL RLC PDU Size Format, for a predetermined priority queue in a new configuration, a Node-B transmits a RADIO LINK RECONFIGURATION FAILURE message for rejecting the request procedure from an RNC, to the RNC.

[2] In re-setting of an asynchronous radio link:

(1) If there is a priority queue that has been set so that the RLC PDU size has a variable length and is not set to use Maximum MAC-d PDU Size Extended, in a new configuration, a Node-B transmits a RADIO LINK RECONFIGURATION FAILURE message for rejecting the request procedure from an RNC, to the RNC.

(2) If there is a priority queue for which the relevant Node B Communication Context has been set so that the MAC-d PDU size has a fixed length and the RLC PDU size has a variable length, in a new configuration, a Node-B transmits a RADIO LINK RECONFIGURATION FAILURE message for rejecting the request procedure from an RNC, to the RNC.

(3) If the relevant Node B Communication Context has been set so that the MAC-d PDU size has a variable length, and does not include an information element, DL RLC PDU Size Format, for a predetermined priority queue in a new configuration, a Node-B transmits a RADIO LINK RECONFIGURATION FAILURE message for rejecting the request procedure from an RNC, to the RNC.

Here, a Node B Communication Context is a term defined in 3GPP, and refers to data information (context) managed for each mobile device (UE).

Third Exemplary Embodiment

In the above-described second exemplary embodiment, as illustrated in FIG. 8, an example in which notification of an RLC size indicator indicating whether the RLC PDU size has a fixed length or a variable length is provided via an NBAP protocol message has been described. However, the present invention is not limited to this. A third exemplary embodiment will be described in terms of an example in which a spare bit in an HS-DSCH DATA FRAME TYPE 2 according to the HS-DSCH frame protocol, which is defined in TS 25.435, is extended, and notification of an RLC size indicator is provided by means of the bit.

The basic configuration of a mobile communication system according to the third exemplary embodiment is similar to the configuration of the system according to the second exemplary embodiment illustrated in FIG. 7.

Figure 11:
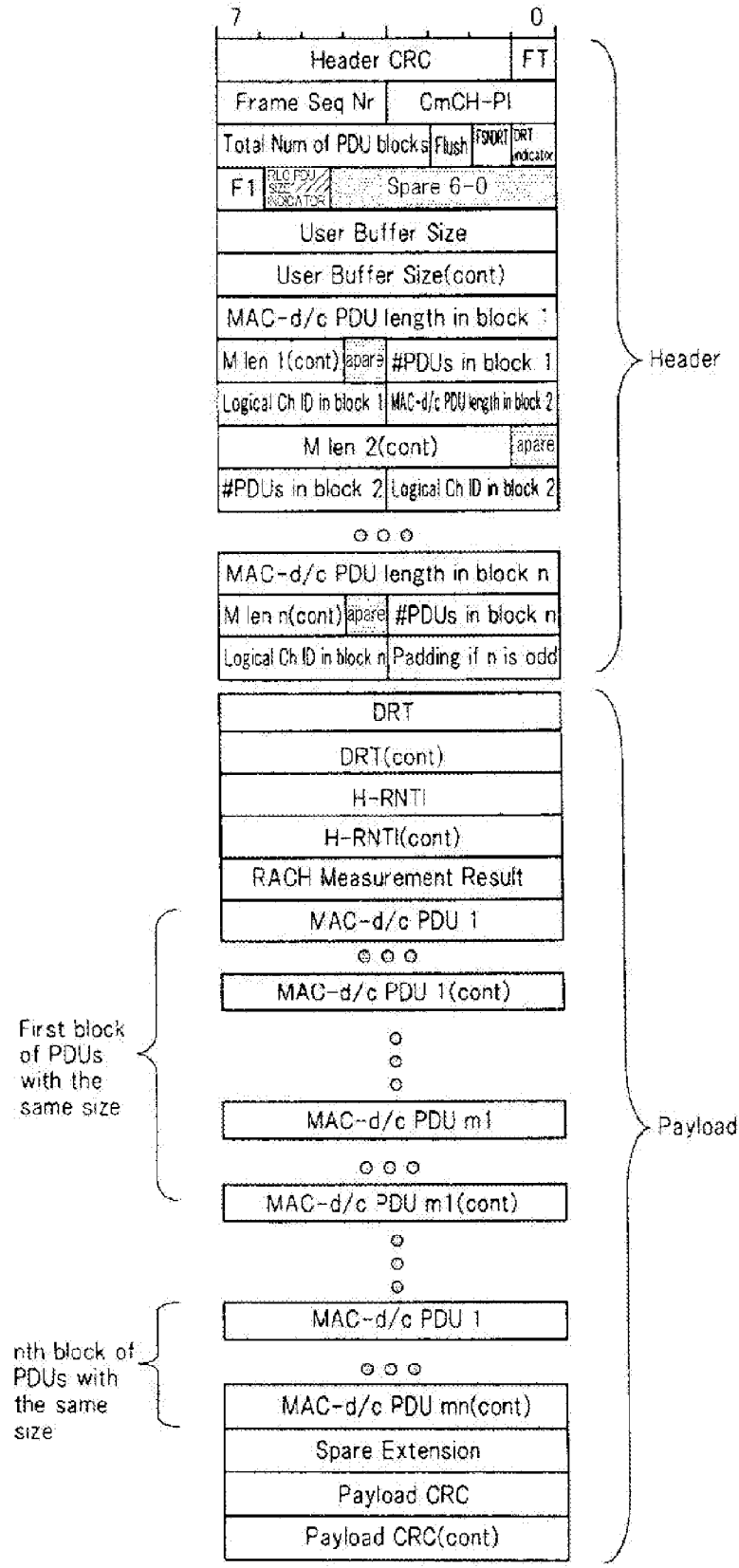
FIG. 11 is a diagram illustrating an example of an HS-DSCH DATA FRAME TYPE 2 according to a third exemplary embodiment.

FIG. 11 is a diagram illustrating an example of an HS-DSCH DATA FRAME TYPE 2 according to the third exemplary embodiment. Referring to FIG. 11, an RLC size indicator is defined in the second bit from the highest-order bit in the forth octet.

Figure 12:
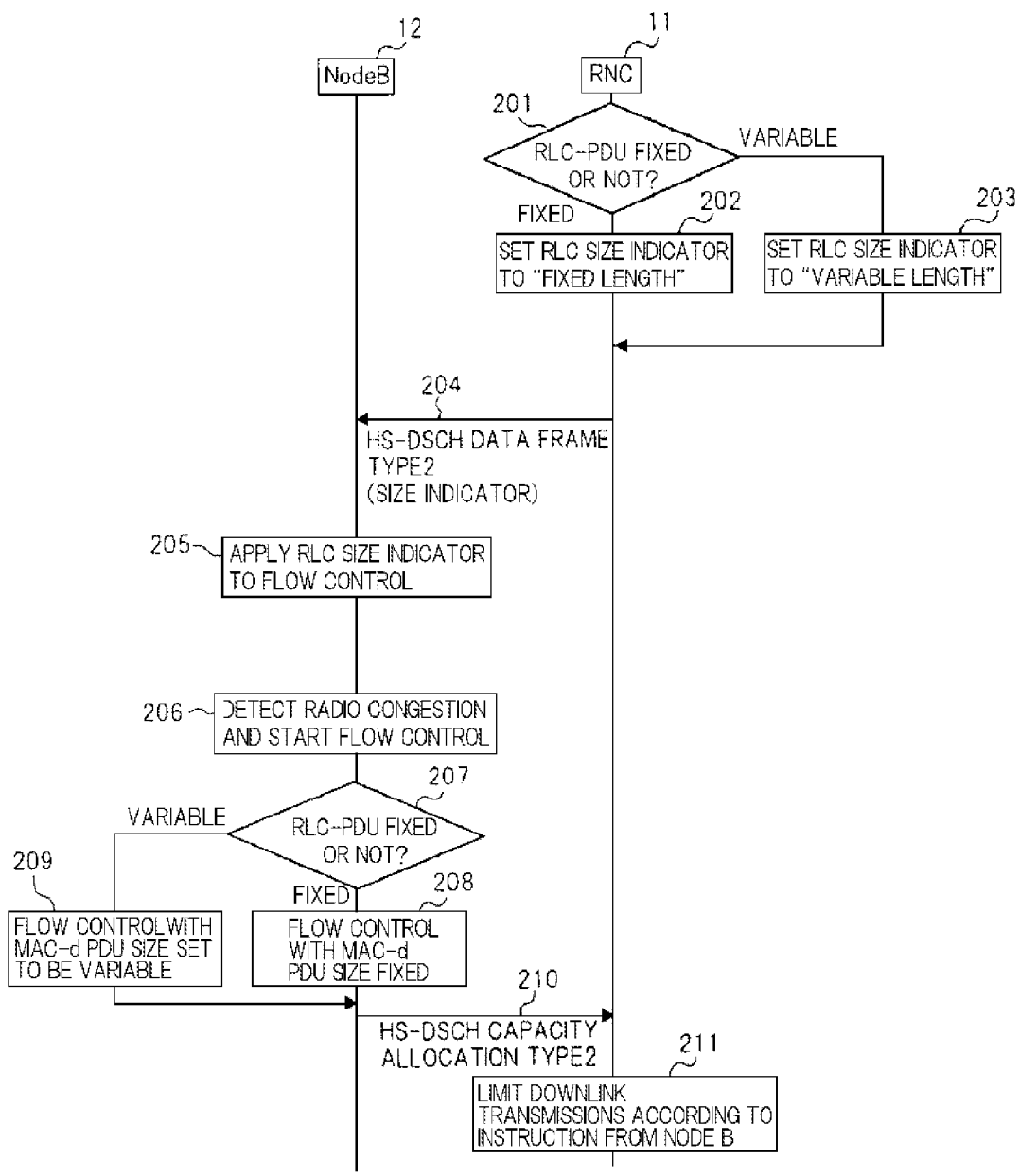
FIG. 12 is a sequence diagram illustrating an operation of a mobile communication system according to the third exemplary embodiment.

FIG. 12 is a sequence diagram illustrating an operation of a mobile communication system according to the third exemplary embodiment. Referring to FIG. 12, call controller 13 in RNC 11 first determines whether the RLC PDU size is fixed or variable (step 201). If the RLC PDU size is fixed, call controller 13 sets an RLC size indicator indicating that the RLC PDU size has a "fixed length", in frame protocol function units 18 (step 202). Meanwhile, if it has been determined in step 201 that the RLC PDU size is variable, call controller 13 sets an RLC size indicator indicating that the RLC PDU size has a "variable length", in frame protocol function units 18 (step 202).

Subsequently, when transmitting a data frame of HS-DSCH DATA FRAME TYPE 2, frame protocol function units 18 in RNC 11 insert an RLC size indicator into the second bit from the highest-order bit in the fourth octet in the frame (step 204).

Upon receipt of the data frame of HS-DSCH DATA FRAME TYPE 2, frame protocol function units 23 in Node-B 12 obtain the RLC size indicator from the frame, and apply the value of the indicator to flow control (step 205).

Frame protocol function units 23 that perform flow control, upon detection of, for example, a radio channel congestion, start flow control (step 206). In the flow control, frame protocol function units 23 first check the RLC size indicator (step 207).

If the RLC PDU size has a fixed length, frame protocol function units 23 keep the MAC-d PDU Length IE fixed, and control the other parameters (step 208). For example, frame protocol function units 23 limit the credits, a transmission interval or a repetition period without changing the MAC-d PDU Length IE, thereby coping with the radio link congestion.

Meanwhile, if it has been determined in step 114 that the RLC PDU size has a variable length, frame protocol function units 23 control the various kinds of parameters including the MAC-d PDU Length IE (step 209).

A flow control instruction from frame protocol function units 23 is provided to RNC 11 via an HS-DSCH CAPACITY ALLOCATION TYPE 2 message (step 210). Frame protocol function units 18 in RNC 11 control downlink data transmissions according to the instruction from frame protocol function units 23 in Node-B 12 (step 211).

As described above, according to the present exemplary embodiment, RNC 11 provides notification of an RLC PDU size indicator to Node-B 12 via an HS-DSCH DATA FRAME TYPE 2, and upon receipt of the HS-DSCH DATA FRAME TYPE 2, Node-B 12 dynamically manages the RLC PDU size indicator according to the notification via the frame. Thus, the present exemplary embodiment enable dynamic control of whether the RLC PDU size has a fixed length or a variable length.

Fourth Exemplary Embodiment

The above-described second exemplary embodiment has been described in terms of an example in which an RLC size indicator is added to HS-DSCH MAC-d flow information, as illustrated in FIG. 9. However, the present invention is not limited to this. A fourth exemplary embodiment will be described in terms of an example in which "Fixed MAC-d PDU Size for MAC-ehs" is added as a new value for HS-DSCH MAC-d PDU Size Format.

The basic configuration of a mobile communication system according to the fourth exemplary embodiment is similar to the configuration of the system according to the second exemplary embodiment illustrated in FIG. 7.

FIG. 13 is a diagram illustrating an example of definition of HS-DSCH MAC-d PDU Size Format according to the fourth exemplary embodiment. Referring to FIG. 13, "Fixed MAC-d PDU Size for MAC-ehs" can be set as a value for HS-DSCH MAC-d PDU Size Format.

For values for HS-DSCH MAC-d PDU Size Format, 3GPP has already provided Indexed MAC-d PDU Size for MAC-hs and Flexible MAC-d PDU Size for MAC-ehs. The present exemplary embodiment is intended to introduce new "Fixed MAC-d PDU Size for MAC-ehs" for MAC-ehs whose RLC PDU size has a fixed length.

According to the present exemplary embodiment, when an HS-DSCH MAC-d PDU Size Format for an HS-DSCH transport channel is set to "Flexible MAC-d PDU Size", the RLC PDU sizes for all the MAC-d flows in the HS-DSCH transport channel have a variable length.

Also, when an HS-DSCH MAC-d PDU Size Format for an HS-DSCH transport channel is set to "Fixed MAC-d PDU Size", the RLC PDU sizes for all the MAC-d flows in the HS-DSCH transport channel have a fixed length.

The HS-DSCH MAC-d flow information used in the second exemplary embodiment is an information element indicating a property of each logical channel mapped in a priority queue. Notification of an RLC PDU size indicator via HS-DSCH MAC-d flow information has enabled indication of whether the RLC PDU size has a fixed length or a variable length for each logical channel. In other words, logical channels whose RLC PDU sizes have a fixed length and logical channels whose RLC PDU sizes have a variable length can be mixed.

Meanwhile, the HS-DSCH MAC-d PDU Size Format used in the fourth exemplary embodiment is an information element designating a property of an HS-DSCH transport channel. Notification of whether the RLC PDU size has a fixed length or a variable length via an HS-DSCH MAC-d PDU Size Format, a mix of logical channels whose RLC PDU sizes have a fixed length and logical channels whose RLC PDU sizes have a variable length is not allowed in an HS-DSCH transport channel.

According to the present exemplary embodiment, whether the RLC PDU size has a fixed length or a variable length may be managed by HS-DSCH transport channel, enabling simplification of processing in RNC 11 and Node-B 12 compared to the second exemplary embodiment.

Fifth Exemplary Embodiment

Although the above second to fourth exemplary embodiments have been described in terms of examples of flow control in HSDPA communications, which are high-speed downlink data communications, the present invention is not limited to these. A fifth exemplary embodiment will be described in terms of an example of a mobile communication system, which provides HSUPA (high-speed uplink packet access) communications, which are high-speed uplink data communication, and which performs flow control thereof.

In 3GPP Release 8, for HSUPA, the MAC-i/MAC-is protocol is introduced to make the RLC PDU size have a variable length. In 3GPP, in addition to the MAC-i/MAC-is protocol, which is introduced in Release 8, the MAC-e/MAC-es protocol is defined.

The MAC-i/MAC-is protocol and the MAC-e/MAC-es protocol are mutually exclusive: only either of the MAC-i/MAC-is protocol or the MAC-e/MAC-es protocol is present in a UE. If the RLC PDU size is set to have a variable length, it is necessary to use the MAC-i/MAC-is protocol.

Also, in the RRC protocol between an RNC and a UE, RB Mapping Info (3GPP TS 25.331) enables notification of whether the RLC PDU size has a fixed length or a variable length, and in addition, in the case of a variable length, enables notification of a minimum value and a maximum value of the RLC PDU size.

Meanwhile, the NBAP protocol between an RNC and a Node-B only enables provision from RNC to Node-B of notification of a maximum value of the MAC-d PDU size (Maximum MAC-d PDU Size Extended IE) for each logical channel mapped in MAC-d flow. Normally, no logical channel multiplexing is performed in the MAC-d protocol, and thus, the MAC-d PDU size is the same as the RLC PDU size.

In general, in flow control in HSUPA communications, there used a method in which a Node-B schedules uplink data transmissions from UEs, and based on the result of the scheduling, provides notification of power that each UE is permitted to use (provides a grant (transmission grant)) to the UE. In this control, power a UE can use is indicated by a grant. The UE determines the amount of data that can be transmitted to an uplink, based on the provided grant.

In HSUPA communications, a Node-B can use the MAC-i/MAC-is, and can consider the maximum value of the RLC PDU size in its flow control. However, in the current NBAP protocol, it is impossible to notify whether the RLC PDU size of each logical channel, that is to be multiplexed, has a fixed length or a variable length, and, if the RLC PDU size has a variable length, it is impossible to notify the smallest value of the RLC PDU size. Consequently, a discrepancy in state relating to the RLC PDU size occurs between a Node-B, an RNC and a UE, which may result in a grant being unable to be properly provided by the Node-B to the UE.

If a grant provided by a Node-B to a UE is smaller than a value corresponding to the fixed length of the RLC PDU size, the UE cannot transmit data to the uplink. Also, even if the RLC PDU size has a variable length, a grant provided by a Node-B to a UE is smaller than a value corresponding to the smallest value of the RLC PDU size, the UE can also not transmit data to the uplink.

Also, there are cases where only a small advantage can be provided by setting the RLC PDU size to have a variable length, like control signals (DCCH: Dedicated Control Channel). Therefore, in some cases, it is preferable that the RLC PDU size of user data in a packet service be set to have a variable length while the RLC PDU size of a control signal is set to have a fixed length. In those cases, for a control signal, it is preferable to use the MAC-i/MAC-is while the RLC PDU size is set to have a fixed length; however, in the current NBAP, notification of such setting cannot be provided.

Therefore, in the present exemplary embodiment, in a mobile communication system providing HSUPA, an RNC notifies a Node-B of whether the RLC PDU size has a fixed length or a variable length, and if the RLC PDU size has a variable length, of a minimum value of the RLC PDU size as well.

Upon receipt of the notification from the RNC, the Node-B determines a grant to be provided to a UE in HSUPA flow control, according to determination based on whether the RLC PDU size has a fixed length or a variable length. Also, if the RLC PDU size has a variable length, the Node-B, if the RLC PDU size has a variable length, determines the grant to be provided to the UE considering the minimum value of the RLC PDU size provided by the RNC.

More specifically, for example, the Node-B provides the UE with a grant sufficient for transmission of data with an RLC PDU size that is larger than the minimum value of the RLC PDU size so as to prevent occurrence of an event in which the UE that is provided with the grant cannot transmit data.

The mobile communication system according to the present exemplary embodiment is similar to the system according to the second exemplary embodiment illustrated in FIG. 7 in including RNC 11 and Node-B 12. However, since the present exemplary embodiment focuses on uplink data communications, MAC-d protocol function unit 17 and MAC-ehs protocol function unit 24 are not needed, instead, a protocol function unit implementing the MAC-i protocol and the MAC-is protocol is needed.

As a basic operation of RNC 11 in the mobile communication system according to the present exemplary embodiment, call controller 13 in RNC 11 determines whether the RLC PDU size is fixed or variable. Call control protocol processor 14 compiles an NBAP protocol message in which information relating to the RLC PDU size, e.g., whether the RLC PDU size has a fixed length or a variable length and in the case of a variable length, a minimum value, is set, and transmits the NBAP protocol message to Node-B 12. On these points, an operation of the system according to the present exemplary embodiment is similar to an operation of the system according to the second exemplary embodiment.

Also, as a basic operation of Node-B 12, upon receipt of an NBAP protocol message, call controller 22 obtains information relating to the RLC PDU size from the message, and flow controllers apply the information to flow control. On this point, operation of the system according to the present exemplary embodiment is similar to operation of the system according to the second exemplary embodiment. However, since the flow control in the present exemplary embodiment is control over uplink data transmitted from UEs, flow control by Node-B 12 is directed to the UEs. More specifically, notification of a flow control instruction is provided to each UE as a provision of a grant as described above.

Although exemplary embodiments have been described above, the present invention is not limited to these exemplary embodiments, and these exemplary embodiments may be used in combination, or may also be partially changed within the scope of the technical idea of the present invention.

The invention claimed is:

1. A mobile communication system comprising a base station and a control device,
   wherein the control device transmits a RADIO LINK SETUP REQUEST message comprising a Radio Link Control (RLC) Protocol Data Unit (PDU) size format information to the base station,
   wherein if the RADIO LINK SETUP REQUEST message does not include a Maximum Medium Access Control-d (MAC-d) PDU Size Extended information and the RLC PDU size format information has a value indicating that an RLC PDU size is variable, the base station rejects a procedure of radio link setup using a RADIO LINK SETUP FAILURE message.

2. A mobile communication system comprising a base station and a control device,
   wherein the control device transmits a RADIO LINK SETUP REQUEST message comprising a Radio Link Control (RLC) Protocol Data Unit (PDU) size format information to the base station,
   wherein the base station rejects a procedure of radio link setup using a RADIO LINK SETUP FAILURE message based on the RLC PDU size format information included in the RADIO LINK SETUP REQUEST message and a High Speed Downlink Shared Channel (HS-DSCH) Medium Access Control—dedicated channel (MAC-d) PDU size format information.

3. The mobile communication system according to claim 2,
   wherein if the RADIO LINK SETUP REQUEST message includes a RLC PDU size format information indicating an RLC PDU size is variable and the HS-DSCH MAC-d PDU size format information indicates that a MAC-d PDU size is fixed, the base station rejects the procedure using the RADIO LINK SETUP FAILURE message.

4. The mobile communication system according to claim 1,
   wherein the RADIO LINK SETUP REQUEST message is transmitted if a procedure of radio link setup is initiated.

5. A control device in a mobile communication system comprising a base station and the control device, the control device comprising:
   a call controller which transmits and receives control messages to and from the base station; and
   a transmitter which transmits a RADIO LINK SETUP REQUEST message comprising a Radio Link Control (RLC) Protocol Data Unit (PDU) size format information to the base station,
   wherein if the RADIO LINK SETUP REQUEST message does not include a Maximum Medium Access Control-d (MAC-d) (PDU) Size Extended information and the RLC PDU size format information has a value indicating that a RLC PDU size is variable, the base station rejects a procedure of radio link setup using a RADIO LINK SETUP FAILURE message.

6. A control device in a mobile communication system comprising a base station and the control device, the control device comprising:
   a call controller which transmits and receives control messages to and from the base station; and
   a transmitter which transmits a RADIO LINK SETUP REQUEST message comprising a Radio Link Control (RLC) Protocol Data Unit (PDU) size format information to the base station,
   wherein the base station rejects a procedure of radio link setup using a RADIO LINK SETUP FAILURE message based on the RLC PDU size format information included in the RADIO LINK SETUP REQUEST message and a High Speed Downlink Shared Channel (HS-DSCH) Medium Access Control-d (MAC-d PDU size format information.

7. The control device according to claim 6,
   wherein if a format indicated by the RLC PDU size format information and a format indicated by the HS-DSCH MAC-d PDU size format information are not same, the base station rejects the procedure using the RADIO LINK SETUP FAILURE message.

8. The control device according to claim 6,
   wherein if the RADIO LINK SETUP REQUEST message includes a RLC PDU size format information indicating an RLC PDU size is variable and the HS-DSCH MAC-d PDU size format information indicates that a MAC-d PDU size is fixed, the base station rejects the procedure using the RADIO LINK SETUP FAILURE message.

9. The control device according to claim 5,
   wherein the RLC PDU size format information indicates whether a RLC PDU size is fixed or not.

10. The control device according to claim 5,
    wherein the RLC PDU size format information is used for a priority queue.

11. The control device according to claim 5,
    wherein the RADIO LINK SETUP REQUEST message is transmitted if a procedure of radio link setup is initiated.

12. A base station in a mobile communication system comprising the base station and a control device, the base station comprising:
    a call controller which transmits and receives control messages to and from the control device; and
    a receiver which receives a RADIO LINK SETUP REQUEST message comprising a Radio Link Control (RLC) Protocol Data Unit (PDU) size format information from the control device,
    wherein if the RADIO LINK SETUP REQUEST message does not include a Maximum Medium Access Control-d (MAC-d) PDU Size Extended information and the RLC PDU size format information has a value indicating that a RLC PDU size is variable, the base station rejects a procedure of radio link setup using a RADIO LINK SETUP FAILURE message.

13. A base station in a mobile communication system comprising the base station and a control device, the base station comprising:
    a call controller which transmits and receives control messages to and from the control device; and
    a receiver which receives a RADIO LINK SETUP REQUEST message comprising a Radio Link Control (RLC) Protocol Data Unit (PDU) size format information from the control device,
wherein the base station rejects a procedure of radio link setup using a RADIO LINK SETUP FAILURE message based on the RLC PDU size format information included in the RADIO LINK SETUP REQUEST message and a High Speed Downlink Shared Channel (HS-DSCH) Medium Access Control-d (MAC-d) PDU size format information.

14. The base station according to claim 13,
wherein if a format indicated by the RLC PDU size format information and a format indicated by the HS-DSCH MAC-d PDU size format information are not same, the base station rejects the procedure using the RADIO LINK SETUP FAILURE message.

15. The base station according to claim 13,
wherein if the RADIO LINK SETUP REQUEST message includes a RLC PDU size format information indicating an RLC PDU size is variable and the HS-DSCH MAC-d PDU size format information indicates that a MAC-d PDU size is fixed, the base station rejects the procedure using the RADIO LINK SETUP FAILURE message.

16. The base station according to claim 12,
wherein the RLC PDU size format information indicates whether a RLC PDU size is fixed or not.

17. The base station according to claim 12,
wherein the RLC PDU size format information is used for a priority queue.

18. The base station according to claim 12,
wherein the RADIO LINK SETUP REQUEST message is transmitted if a procedure of radio link setup is initiated.

19. A method for a base station in a mobile communication system, the method comprising:
receiving a RADIO LINK SETUP REQUEST message comprising a Radio Link Control (RLC) Protocol Data Unit (PDU) size format information,
wherein if the RADIO LINK SETUP message does not include a Maximum Medium Access Control-d (MAC-d) PDU Size Extended information and the RLC PDU size format information has a value indicating that a RLC PDU size is variable, the base station rejects a procedure of radio link setup using a RADIO LINK SETUP FAILURE message.

20. A method for a base station in a mobile communication system, the method comprising:
receiving a RADIO LINK SETUP REQUEST message comprising a Radio Link Control (RLC) Protocol Data Unit (PDU) size format information,
wherein the base station rejects a procedure of radio link setup using a RADIO LINK SETUP FAILURE message based on the RLC PDU size format information included in the RADIO LINK SETUP REQUEST message and a High Speed Downlink Shared Channel (HS-DSCH) Medium Access Control-d (MAC-d) PDU size format information.

21. A method for a control device in a mobile communication system, the method comprising:
transmitting a RADIO LINK SETUP REQUEST message comprising a Radio Link Control (RLC) Protocol Data Unit (PDU) size format information,
wherein if the RADIO LINK SETUP REQUEST message does not include a Maximum Medium Access Control-d (MAC-d) PDU Size Extended information and the RLC PDU size format information has a value indicating that a RLC PDU size is variable, a base station which receives the RADIO LINK SETUP REQUEST message rejects a procedure of radio link setup using a RADIO LINK SETUP FAILURE message.

22. A method for a control device in a mobile communication system, the method comprising:
transmitting a RADIO LINK SETUP REQUEST message comprising a Radio Link Control (RLC) Protocol Data Unit (PDU) size format information,
wherein a base station which receives the RADIO LINK SETUP REQUEST message rejects a procedure of radio link setup using a RADIO LINK SETUP FAILURE message based on the RLC PDU size format information included in the RADIO LINK SETUP REQUEST message and a High Speed Downlink Shared Channel (HS-DSCH) Medium Access Control-d (MAC-d) PDU size format information.

23. A method for a mobile communication system, the method comprising:
transmitting a RADIO LINK SETUP REQUEST message comprising a Radio Link Control (RLC) Protocol Data Unit (PDU) size format information,
wherein if the RADIO LINK SETUP REQUEST message does not include a Maximum Medium Access Control-d (MAC-d) PDU Size Extended information and the RLC PDU size format information has a value indicating that a RLC PDU size is variable, a base station which receives the RADIO LINK SETUP REQUEST message rejects a procedure of radio link setup using a RADIO LINK SETUP FAILURE message.

24. A method for a mobile communication system, the method comprising:
transmitting a RADIO LINK SETUP REQUEST message comprising a Radio Link Control (RLC) Protocol Data Unit (PDU) size format information,
wherein a base station which receives the RADIO LINK SETUP REQUEST message rejects a procedure of radio link setup using a RADIO LINK SETUP FAILURE message based on the RLC PDU size format information included in the RADIO LINK SETUP REQUEST message and a High Speed Downlink Shared Channel (HS-DSCH) Medium Access Control-d (MAC-d) PDU size format information.

* * * * *